US006759584B2

(12) United States Patent
Sundström

(10) Patent No.: US 6,759,584 B2
(45) Date of Patent: Jul. 6, 2004

(54) SUPPORTING DEVICE FOR MUSIC INSTRUMENT

(75) Inventor: Jari Sundström, Kouvola (FI)

(73) Assignee: Kari Laukka, Kouvola (FI)

(*) Notice: Subject to any disclaimer, the term of this patent is extended or adjusted under 35 U.S.C. 154(b) by 0 days.

(21) Appl. No.: 10/257,548

(22) PCT Filed: Apr. 12, 2001

(86) PCT No.: PCT/FI01/00370

§ 371 (c)(1), (2), (4) Date: Oct. 15, 2002

(87) PCT Pub. No.: WO01/80218

PCT Pub. Date: Oct. 25, 2001

(65) Prior Publication Data

US 2003/0164083 A1 Sep. 4, 2003

(51) Int. Cl.[7] ................................................ G09B 15/06

(52) U.S. Cl. .......................... 84/469; 84/453; 84/387 A

(58) Field of Search .......................... 84/453, 465, 468, 84/469, 387 A, 379, 290, 327, 328, 329, 385 A, 421

(56) References Cited

U.S. PATENT DOCUMENTS 3,847,051 A * 11/1974 Miller ...................... 84/387 A
4,204,455 A * 5/1980 Harrington ................... 84/468
4,348,935 A * 9/1982 Bay .......................... 84/380 R
4,728,123 A 3/1988 Kassal et al.
4,836,531 A * 6/1989 Niks ........................... 482/44
4,841,829 A 6/1989 Lehmann
5,553,529 A 9/1996 Smith
5,753,840 A * 5/1998 Saboia De Albuquerque .......... 84/453

FOREIGN PATENT DOCUMENTS

| | | | |
|---|---|---|---|
| DE | 36 42 134 | 6/1988 | |
| DE | 3708693 A1 * | 9/1988 | ............ G10D/3/18 |
| DE | 195 05 745 | 8/1996 | |
| FR | 2 247 658 | 12/1979 | |

* cited by examiner

*Primary Examiner*—Kimberly Lockett
(74) *Attorney, Agent, or Firm*—Burns, Doane, Swecker & Mathis, L.L.P.

(57) ABSTRACT

A handrest for musical instruments includes a fastening loop attached to the instrument, a handrest handle attached to the fastening loop that shifts the weight of the instrument from the player's thumb to the fold between the player's thumb and index finger, the handrest handle including an upper end for resting on the players fold, a palm portion extending downwardly from the upper end for contacting the player's palm, and a turning joint at a plam point of the lower palm portion, the palm point spaces downwardly from the upper end.

5 Claims, 1 Drawing Sheet

SUPPORTING DEVICE FOR MUSIC INSTRUMENT

BACKGROUND AND FIELD OF THE INVENTION

This invention relates to a handrest intended to facilitate the support of woodwind instruments and similar objects. Previously the weight of the instrument used to be supported by the tip of the thumb/the edge of the thumb tip. A belt passing behind the player's neck was ed to carry heavier instruments, such as for instance a saxo-phone.

Due to the conventional manner of supporting without auxiliary means, the tendon between the thumb and the wrist was exposed to strain, resulting in tenosynovitis. The edge of the thumb tip tended to grow a callus and started developing a tumour in the rubbed area.

When a handrest is used, the weight of the instrument is shifted from the thumb to the fold between the thumb and the index finger. This reduces the strain on the sheath of the tendon, and the thumb will no longer grow a callus. This allows longer practicing periods and more rapid achievements, while providing more sensitive fingering techniques.

The handrest of the invention is characterised in having a taming joint at the point of the palm, allowing adjustment of the instrument position by means of adjusting members with a view to optimal hand trajectories for different playing styles and hands.

The invention is explained in greater detail below with reference to the accompanying drawings, in which

DETAILED DESCRIPTION OF A PREFERRED EMBODIMENT OF THE PRESENT INVENTION

BRIEF SUMMARY OF A PREFERRED EMBODIMENT OF THE PRESENT INVENTION

Figure 1:
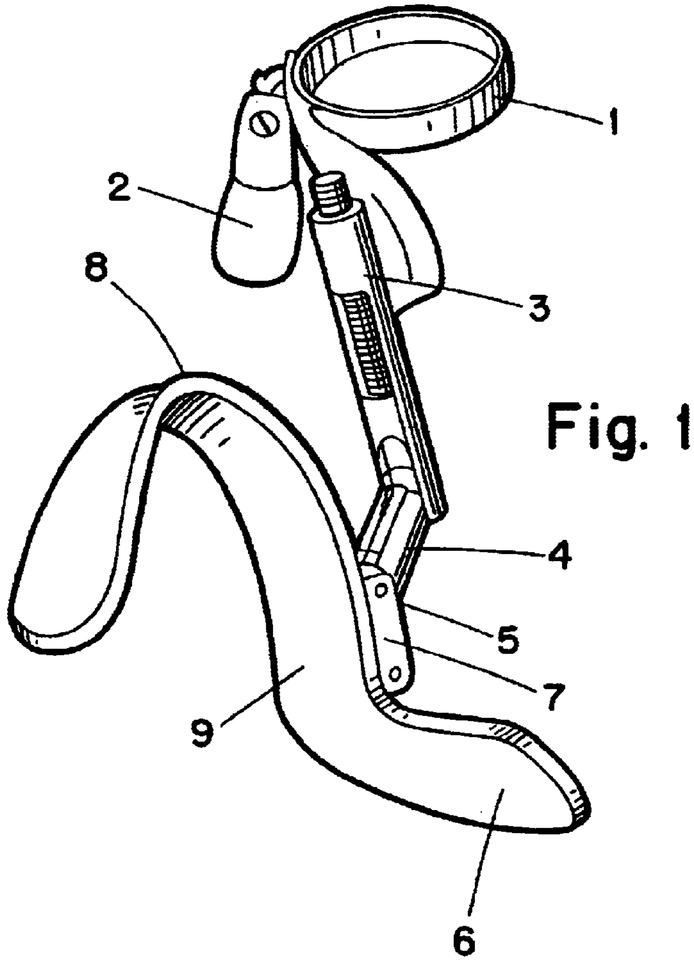
FIG. 1 shows the handrest viewed from the user's right-hand side
Figure 2:
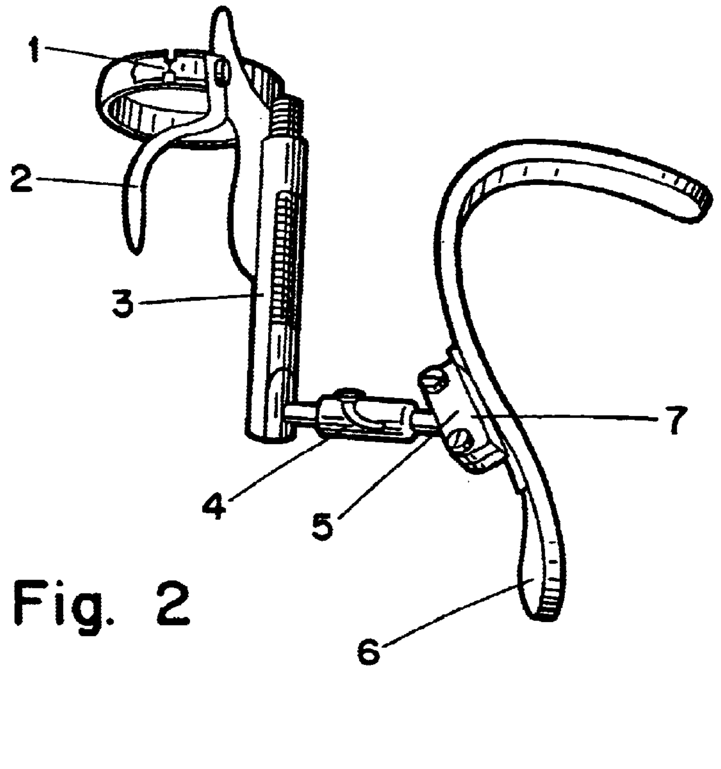
FIG. 2 shows the handrest from the user's view

One embodiment of the present invention comprises a fastening loop for attaching an instrument to a handrest handle. The handrest handle attaches to the fastening loop and shifts the weight of the instrument from the player's thumb to the fold between the player's thumb and index finger. This embodiment of the present invention is characterized in that the handle includes an upper end for resting on the player's fold, and a palm portion extending downwardly from the upper end for contacting the player's palm. A turning joint is attached to the lower palm portion of the handrest thereby allowing the instrument position to be adjusted by way of adjusting members to achieve optimal hand trajectories for different players.

The handrest is fastened to the object to be supported by means of a fastening loop 1 which is tightened around the object. The fastening loop varies in size as a function of the diameter of the instrument. Attached to the fastening ring is a counterbalance support 2, which allows the balance to be maintained during open G fingering. Attached to the fastening loop, there is also a cylindrical part 3, oriented downwardly in the axial direction of the fastening loop and having a typical length in the range from 8 to 10 cm, which allows vertical adjustment of the handrest by means of a slide rail, a telescopic member or similar, in order to provide optimal height for different hand sizes relative to the instrument. The instrument comprises a second, shorter cylindrical part 4, connected over a turning joint at angles of 90° to the previous part 3, so that the handrest distance can be adjusted by means of a slide rail, a telescopic member or the like, in order to provide the optimal distance for different finger lengths. Part 4 is connected over a turning joint to a spacer 5. With the turning joint is locked into different positions, the distance caused by rotation can be controlled. The handle part 6 comprises an upper end 8 for supporting the weight of the handrest and instrument on the player's fold between the index finder and thumb, and a palm portion 9 extending from the upper end for contacting the player's palm. The spacer 5 fastens the part 4 to a palm point 7 located on the palm portion of the handle part 6 of the handrest in a downwardly spaced relationship from the upper end. The spacer 5 allows adjustment of the height and angle of the palm point 7 with a view to optimal trajectories for different playing styles and hands. The handle part 6 has been given a shape that fits into the hand, and it is typically made of plastic. The upper end is supported in the fold between the player's thumb and index finger, shifting the weight of the instrument to this area, while the portion contacts the player's palm.

What is claimed is:

1. A handrest for musical instruments, comprising a fastening loop attached to the instrument and a handrest handle, which is attached to the fastening loop and shifts the weight of the instrument from a player's thumb to the fold between the player's thumb and index finger, characterised in that the handrest handle includes an upper end for resting on the player's fold, and a palm portion extending downwardly from the upper end for contacting the player's palm, the handrest further including a turning joint at a palm point of the palm portion, allowing the instrument position to be adjusted by means of adjusting members with a view to optimal hand trajectories for different playing styles and hands, the palm point spaced downwardly from the upper end.

2. A handrest as defined in claim 1, characterised in that a telescopic vertical control member, which allows substantially vertical adjustment for different hand sizes, is provided between the fastening loop and the handrest handle part.

3. A handrest as defined in claim 1, characterised in that a telescopic distance control member, which allows distance control for different finger lengths, is provided between the fastening loop and the handrest handle part.

4. A handrest as defined in claim 1, characterised in that it allows for rotation control by means of a turning joint between the telescopic distance control member and spacer with a view to distance control.

5. A handrest as defined in claim 1, characterised in that it allows for control of the height and the angle of the palm point by means of the spacer with a view to optimal trajectories for different playing styles and hands.

* * * * *